US007454010B1

(12) United States Patent
Ebenezer

(10) Patent No.: US 7,454,010 B1
(45) Date of Patent: Nov. 18, 2008

(54) NOISE REDUCTION AND COMFORT NOISE GAIN CONTROL USING BARK BAND WEINER FILTER AND LINEAR ATTENUATION

(75) Inventor: Samuel Ponvarma Ebenezer, Tempe, AZ (US)

(73) Assignee: Acoustic Technologies, Inc., Mesa, AZ (US)

( * ) Notice: Subject to any disclaimer, the term of this patent is extended or adjusted under 35 U.S.C. 154(b) by 788 days.

(21) Appl. No.: 10/979,969

(22) Filed: Nov. 3, 2004

(51) Int. Cl.
*H04M 1/00* (2006.01)

(52) U.S. Cl. ................................................ 379/392.01

(58) Field of Classification Search ............ 379/392.01
See application file for complete search history.

(56) References Cited

U.S. PATENT DOCUMENTS

| | | | | |
|---|---|---|---|---|
| 6,377,637 | B1 * | 4/2002 | Berdugo | 375/346 |
| 6,625,284 | B1 * | 9/2003 | Ariyama | 381/66 |
| 2006/0229869 | A1 * | 10/2006 | Nemer | 704/226 |

* cited by examiner

*Primary Examiner*—Ramnandan Singh
(74) *Attorney, Agent, or Firm*—Paul F. Wille

(57) ABSTRACT

A combination of noise suppression using a Bark band modified Weiner filter and linear noise reduction improves elimination of noise in a telephone. A detector for detecting long, non-speech intervals is coupled to the output of the noise suppresser and controls selection of noise suppression or noise reduction. A gain smoothing filter has a long time constant when noise reduction is used and provides a gradual transition from one level of gain to another. Comfort noise is smoothly inserted by updating the data for generating comfort noise only during detected long, non-speech intervals.

8 Claims, 6 Drawing Sheets

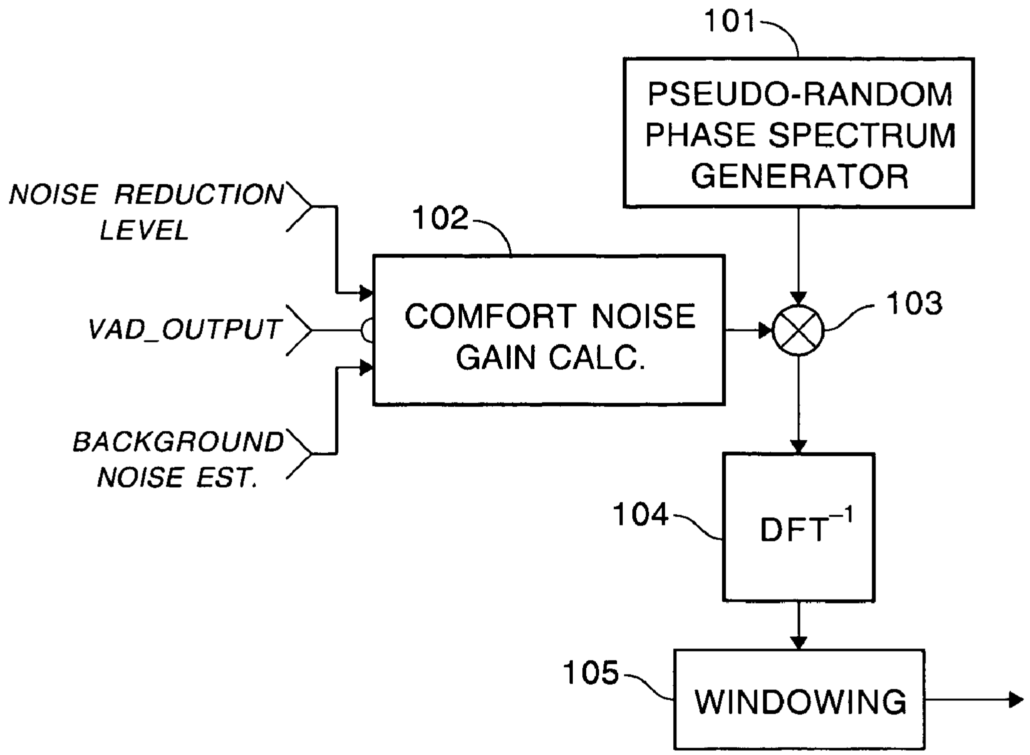
FIG. 9
FIG. 13
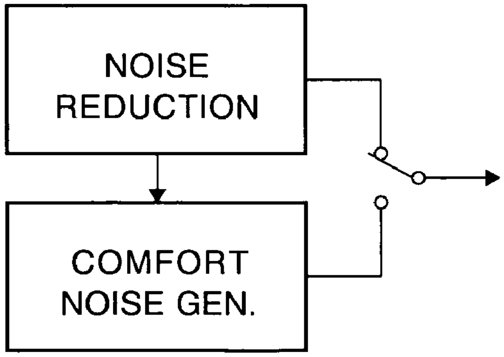

NOISE REDUCTION AND COMFORT NOISE GAIN CONTROL USING BARK BAND WEINER FILTER AND LINEAR ATTENUATION

CROSS-REFERENCE TO RELATED APPLICATION

This application relates to application Ser. No. 10/868,989, filed Jun. 15, 2004, entitled Comfort Noise Generator Using Modified Doblinger Noise Estimate, and to application Ser. No. 10/830,652, filed Apr. 22, 2004, entitled Noise Suppression Based on Bark Band Weiner Filtering and Modified Doblinger Noise Estimate, each assigned to the assignee of this invention, and incorporated by reference herein in their entireties.

BACKGROUND OF THE INVENTION

This invention relates to audio signal processing and, in particular, to a circuit that improves noise suppression and generation of comfort noise in telephones.

As used herein, "telephone" is a generic term for a communication device that utilizes, directly or indirectly, a dial tone from a licensed service provider. As such, "telephone" includes desk telephones (see FIG. 1), cordless telephones (see FIG. 2), speaker phones (see FIG. 3), hands free kits (see FIG. 4), and cellular telephones (see FIG. 5), among others. For the sake of simplicity, the invention is described in the context of telephones but has broader utility; e.g. communication devices that do not utilize a dial tone, such as radio frequency transceivers or intercoms.

There are many sources of noise in a telephone system. Some noise is acoustic in origin while the source of other noise is electronic, the telephone network, for example. As used herein, "noise" refers to any unwanted sound, whether or not the unwanted sound is periodic, purely random, or somewhere in-between. As such, noise includes background music, voices of people other than the desired speaker, tire noise, wind noise, and so on. Automobiles can be especially noisy environments.

As broadly defined, noise could include an echo of the speaker's voice. However, echo cancellation is separately treated in a telephone system and involves modeling the transfer characteristic of a signal path. Moreover, the model is changed or adapted over time as the characteristics, e.g. frequency response and delay or phase shift, of the path change.

While not universally followed, the prior art generally associates noise "suppression" with subtraction and noise "reduction" with attenuation or reduced gain. As used herein, noise suppression includes subtraction of one signal from another to decrease the amount of noise.

A state of the art adaptive echo canceling algorithm alone is not sufficient to cancel an echo completely. A modeling error introduced by the echo canceler will result in a residual echo after the echo cancellation process. This residual echo is annoying to a listener. Residual echo is a problem whether or not there is background noise. Even if the background noise level is greater than the residual echo, the residual echo is annoying because, as the residual echo comes and goes, it is more perceptible to the listener. In most cases, the spectral properties of the residual echo are different from the background noise, making it even more perceptible.

Various techniques, such as residual echo suppresser and non-linear processor, are employed to eliminate the residual echo. Even though a residual echo suppresser works well in a noise free environment, some additional signal processing is needed to make this technique work in a noisy environment. In a noisy environment, the non-linear processing of the residual echo suppresser produces what is known as noise pumping. When the residual echo is suppressed, the additive background noise is also suppressed, resulting in noise pumping. To reduce the annoying effects of noise pumping, comfort noise, matched to the background noise, is inserted when the echo suppresser is activated.

The above-identified applications disclose improved systems for reducing noise and adding comfort noise, a problem remains during long non-speech intervals, e.g. longer than 300 milliseconds. Noise suppression systems using a Bark band based, modified Weiner filter may not adequately reduce noise without introducing tonal artifacts during long non-speech intervals. Further, when a residual echo suppresser and noise suppresser are enabled in a complementary manner care should be taken during the comfort noise generation process because comfort noise is estimated before the noise suppression process and noise level will be different after the noise suppression. Thus, a robust method is needed to track changes, spectral and level, that are introduced by the noise suppression algorithm.

Comfort noise generators that utilize actual background noise take time to adjust spectral content, during which time the noise can become noticeably different from actual background noise during long non-speech intervals. Synthetic comfort noise is not matched to real background noise when noise reduction is enabled. It is difficult to adjust the gain of the comfort noise when the gain parameter in the noise suppression algorithm is changed.

Those of skill in the art recognize that, once an analog signal is converted to digital form, all subsequent operations can take place in one or more suitably programmed microprocessors. Use of the word "signal", for example, does not necessarily mean either an analog signal or a digital signal. Data in memory, even a single bit, can be a signal. Similarly, "memory" relates to function, not form. It does not matter that the data is stored in a register in a microprocessor, in random access memory, in read only memory, or in any other kind of storage medium.

In view of the foregoing, it is therefore an object of the invention to increase noise suppression during long non-speech intervals.

Another object of the invention is to improve spectral matching of comfort noise to background noise.

A further object of the invention is to provide a comfort noise generator that substantially eliminates noise pumping.

Another object of the invention is to provide dynamic adjustments of the level of comfort noise that is dependent on noise reduction tuning parameters, thereby eliminating tuning in real time.

SUMMARY OF THE INVENTION

The foregoing objects are achieved in this invention in which an audio processing circuit includes a Bark band based, modified Weiner filter and a linear noise reduction circuit. A detector for detecting long, non-speech intervals switches to linear noise reduction from Bark band Weiner filtering when a long, non-speech interval is detected. Linear noise reduction allows greater noise reduction than Bark band Weiner filtering and produces no musical artifacts. A gain smoothing filter has a long time constant when linear noise reduction is used and provides a gradual transition from one level of gain to another. A detector controls the estimate of background noise for comfort noise generation when there is a long non-speech interval, thereby improving the generation of comfort noise.

Comfort noise is further improved by adjusting the gain of the comfort noise based upon data from spectral gain calculation circuitry from either the linear noise reduction circuit or the Bark band Weiner filter.

BRIEF DESCRIPTION OF THE DRAWINGS

A more complete understanding of the invention can be obtained by considering the following detailed description in conjunction with the accompanying drawings, in which:

FIG. 9 is a waveform illustrating speech and non-speech intervals in a signal;

FIG. 13 illustrates another aspect of the invention.

Because a signal can be analog or digital, a block diagram can be interpreted as hardware, software, e.g. a flow chart, or a mixture of hardware and software. Programming a microprocessor is well within the ability of those of ordinary skill in the art, either individually or in groups.

DETAILED DESCRIPTION OF THE INVENTION

Figure 1:
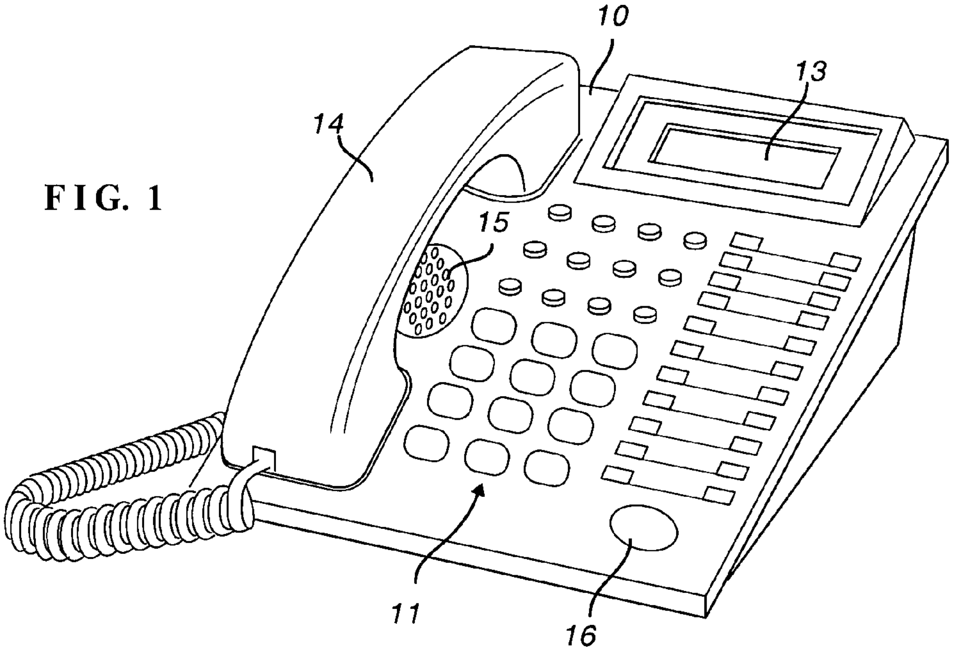
FIG. 1 is a perspective view of a desk telephone.
Figure 2:
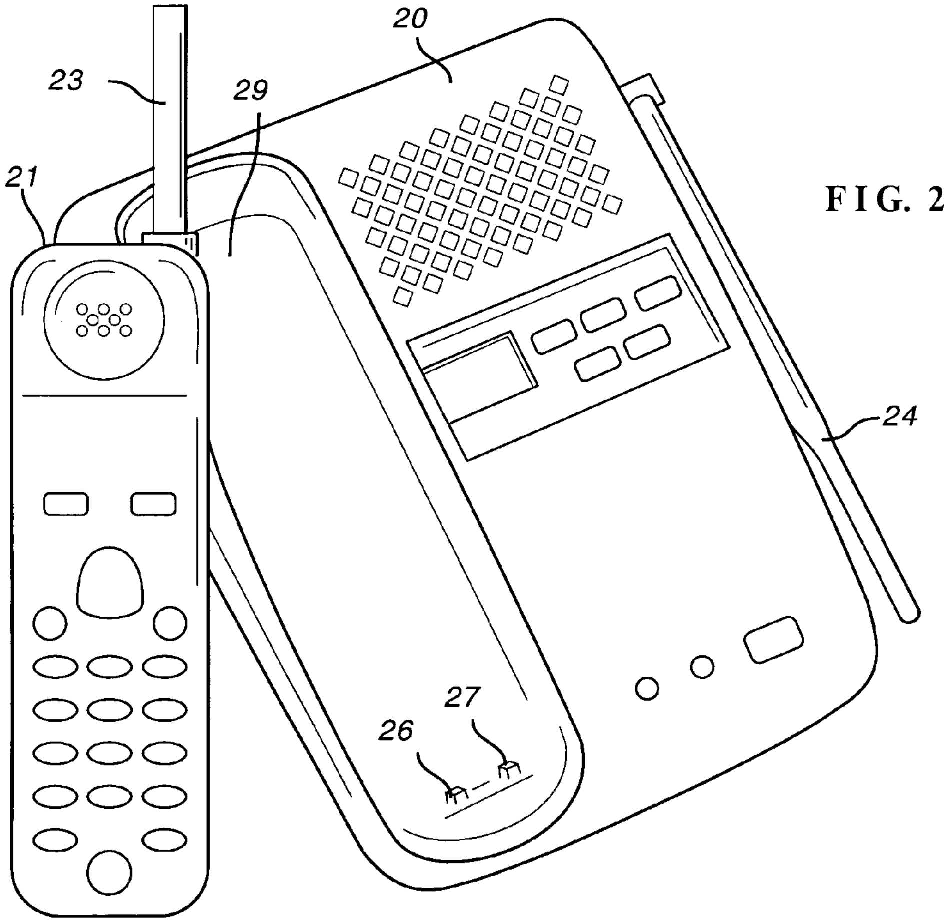
FIG. 2 is a perspective view of a cordless telephone.

This invention finds use in many applications where the internal electronics is essentially the same but the external appearance of the device is different. FIG. 1 illustrates a desk telephone including base 10, keypad 11, display 13 and handset 14. As illustrated in FIG. 1, the telephone has speaker phone capability including speaker 15 and microphone 16. The cordless telephone illustrated in FIG. 2 is similar except that base 20 and handset 21 are coupled by radio frequency signals, instead of a cord, through antennas 23 and 24. Power for handset 21 is supplied by internal batteries (not shown) charged through terminals 26 and 27 in base 20 when the handset rests in cradle 29.

Figure 3:
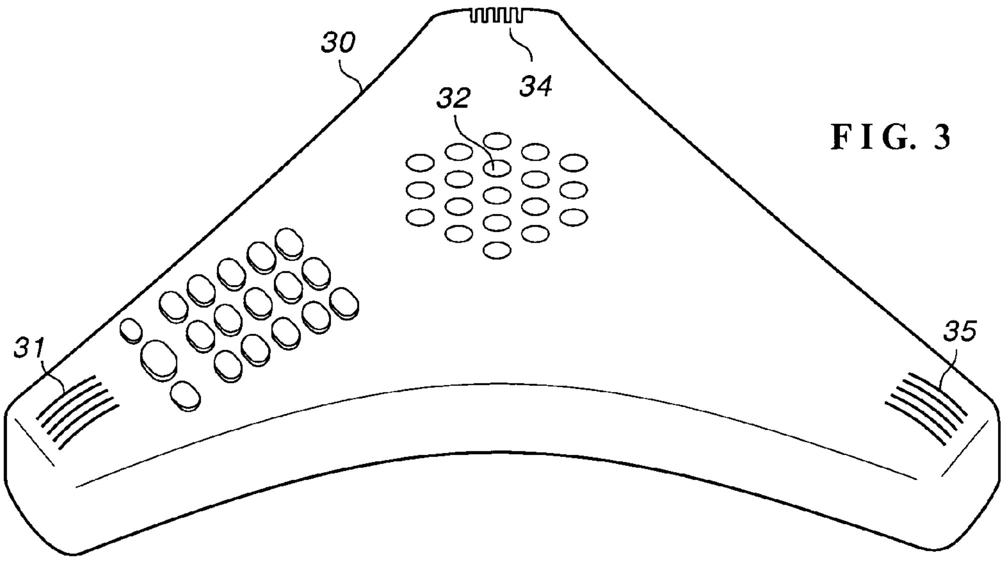
FIG. 3 is a perspective view of a conference phone or a speaker phone.

FIG. 3 illustrates a conference phone or speaker phone such as found in business offices. Telephone 30 includes microphone 31 and speaker 32 in a sculptured case. Telephone 30 may include several microphones, such as microphones 34 and 35 to improve voice reception or to provide several inputs for echo rejection or noise rejection, as disclosed in U.S. Pat. No. 5,138,651 (Sudo).

Figure 4:
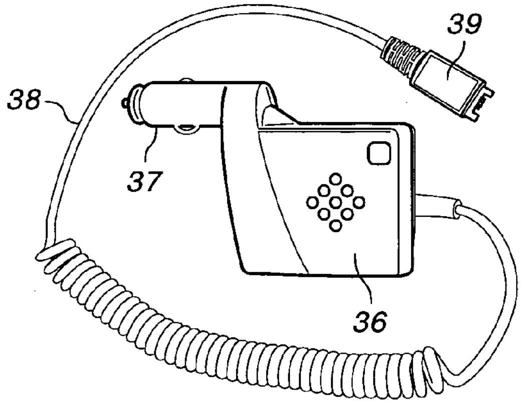
FIG. 4 is a perspective view of a hands free kit.
Figure 5:
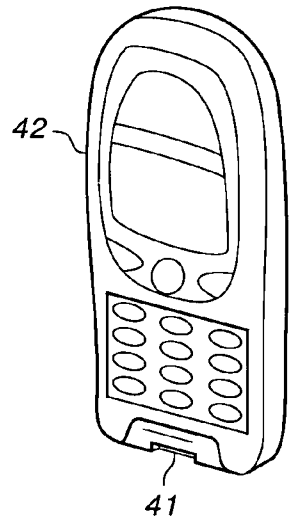
FIG. 5 is a perspective view of a cellular telephone.

FIG. 4 illustrates what is known as a hands free kit for providing audio coupling to a cellular telephone, illustrated in FIG. 5. Hands free kits come in a variety of implementations but generally include powered speaker 36 attached to plug 37, which fits an accessory outlet or a cigarette lighter socket in a vehicle. A hands free kit also includes cable 38 terminating in plug 39. Plug 39 fits the headset socket on a cellular telephone, such as socket 41 (FIG. 5) in cellular telephone 42. Some kits use RF signals, like a cordless phone, to couple to a telephone. A hands free kit also typically includes a volume control and some control switches, e.g. for going “off hook” to answer a call. A hands free kit also typically includes a visor microphone (not shown) that plugs into the kit. Audio processing circuitry constructed in accordance with the invention can be included in a hands free kit or in a cellular telephone.

Figure 6:
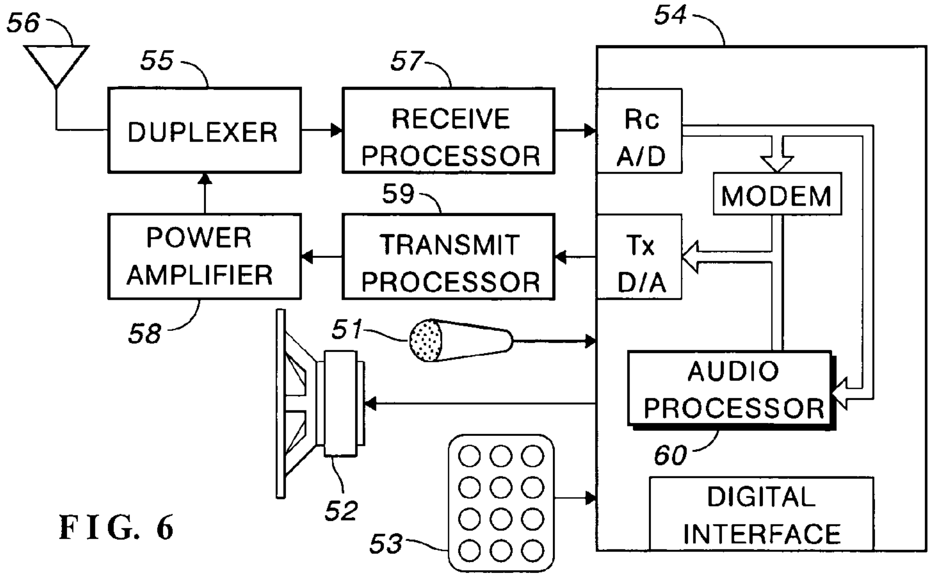
FIG. 6 is a generic block diagram of audio processing circuitry in a telephone.

The various forms of telephone can all benefit from the invention. FIG. 6 is a block diagram of the major components of a cellular telephone. Typically, the blocks correspond to integrated circuits implementing the indicated function. Microphone 51, speaker 52, and keypad 53 are coupled to signal processing circuit 54. Circuit 54 performs a plurality of functions and is known by several names in the art, differing by manufacturer. For example, Infineon calls circuit 54 a “single chip baseband IC.” QualComm calls circuit 54 a “mobile station modem.” The circuits from different manufacturers obviously differ in detail but, in general, the indicated functions are included.

A cellular telephone includes both audio frequency and radio frequency circuits. Duplexer 55 couples antenna 56 to receive processor 57. Duplexer 55 couples antenna 56 to power amplifier 58 and isolates receive processor 57 from the power amplifier during transmission. Transmit processor 59 modulates a radio frequency signal with an audio signal from circuit 54. In non-cellular applications, such as speakerphones, there are no radio frequency circuits and signal processor 54 may be simplified somewhat. Problems of echo cancellation and noise remain and are handled in audio processor 60. It is audio processor 60 that is modified to include the invention.

Most modern noise reduction algorithms are based on a technique known as spectral subtraction. If a clean speech signal is corrupted by an additive and uncorrelated noisy signal, then the noisy speech signal is simply the sum of the signals. If the power spectral density (PSD) of the noise source is completely known, it can be subtracted from the noisy speech signal using a Weiner filter to produce clean speech; e.g. see J. S. Lim and A. V. Oppenheim, “Enhancement and bandwidth compression of noisy speech,” *Proc. IEEE*, vol. 67, pp. 1586-1604, December 1979. Normally, the noise source is not known, so the critical element in a spectral subtraction algorithm is the estimation of power spectral density (PSD) of the noisy signal.

Figure 7:
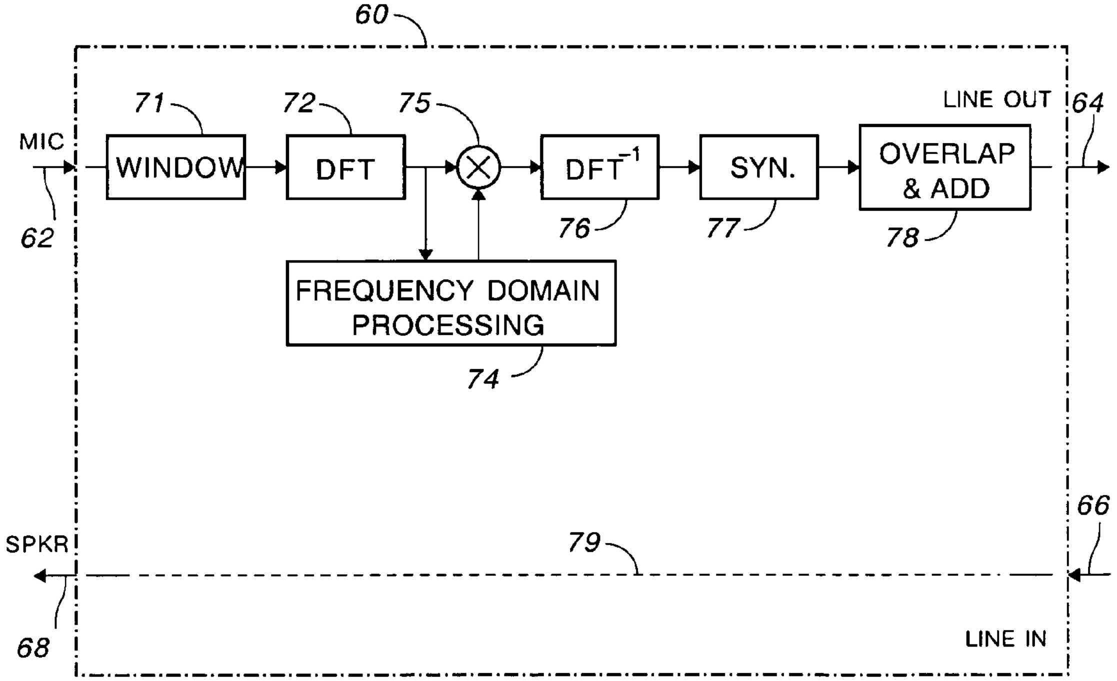
FIG. 7 is a block diagram of a noise suppresser constructed in accordance with the invention.

FIG. 7 is a block diagram of a portion of audio processor 60 including a noise suppresser constructed in accordance with the invention. In addition to noise suppression, audio processor 60 includes echo cancellation, additional filtering, and other functions, that are not part of this invention. A second noise suppression circuit and comfort noise generator can be coupled in the receive channel, between line input 66 and speaker output 68, represented by dashed line 79.

The noise reduction process is performed by processing a plurality of samples of an input signal together as a group. Groups of data are often referred to as “blocks.” To avoid confusion with blocks in a figure in the drawings, a group of thirty-two samples is a “frame” and a group of four frames (128 samples) is a “super-frame.” Because four frames are processed together, the input data must be buffered for processing. A buffer size of one hundred twenty-eight words is used for storing samples for windowing the input data.

The buffered data is windowed, represented by block 71, to reduce the artifacts introduced by group processing in the frequency domain. Different window options are available. Window selection is based on various factors, such as the main lobe width, side lobes levels, and the overlap size. The type of window used in the pre-processing influences the main lobe width and the side lobe levels. For example, the Hanning window has a broader main lobe and lower side lobe levels as compared to a rectangular window. Several types of windows are known in the art and can be used, with suitable adjustment in some parameters such as gain and smoothing coefficients.

The artifacts introduced by frequency domain processing are exacerbated if a small overlap is used. A large overlap will result in an increase in computational requirements. Using a synthesis window reduces the artifacts introduced at the reconstruction stage. Considering all the above factors, a smoothed, trapezoidal analysis window and a smoothed, trapezoidal synthesis window, each with twenty-five percent overlap, are used in a preferred embodiment of the invention. For a 128-point discrete Fourier transform, a twenty-five percent overlap means that the last thirty-two samples from the previous super-frame are used as the first (oldest) thirty-two samples for the current super-frame. Thus, at the industry standard sample rate of 8 kHz., each frame represents 4 milliseconds of signal and each super-frame represents 16 ms. of signal. Because of overlap, a super-frame can be generated every 12 ms.

The windowed time domain data is transformed to the frequency domain using discrete Fourier transform 72. The frequency response of the noise suppression circuit is calculated and has several aspects that are illustrated in the block diagram of FIG. 8. Signal to noise ratio detector 96 and comfort noise generator 98 tap into the frequency domain processing circuit to share the spectral data generated from the background noise estimate. These functions are described in detail below.

In block 81, the power spectral density of the noisy speech is approximated as a running average of the present super-frame and the average of the previous super-frames, each suitably weighted. Sub-band noise estimate 85 uses Bark bands (also called "critical bands") that model the perception of a human ear. The DFT of the noisy speech frame is divided into 17 Bark bands. Sub-band energy is estimated in block 82 and subband noise is estimated in block 85.

It is known in the art to calculate spectral gain as a function of signal to noise ratio based on generalized Weiner filtering; see L. Arsian, A. McCree, V. Viswanathan, "New methods for adaptive noise suppression," *Proceedings of the* 26*th IEEE International Conference on Acoustics, Speech, and Signal Processing*, ICASSP-01, Salt Lake City, Utah, pp. 812-815, May 2001. The filter applies stronger suppression for noisy frames and weaker suppression during voiced speech frames.

Signal to noise ratio is calculated in each band in each frame in block 86. Finally, spectral gain value is calculated in block 89 by using the Bark band SNR in the modified Weiner solution. One of the drawbacks of spectral subtraction based methods is the introduction of musical tone artifacts. Due to inaccuracies in the noise estimation, some spectral peaks will be left as a residue after spectral subtraction. These spectral peaks manifest themselves as musical tones. In order to reduce these artifacts, the noise suppression factor must be kept at a higher value than calculated. However, a high value will result in more voiced speech distortion. Tuning the parameter is a tradeoff between speech amplitude reduction and musical tone artifacts. This leads to a new mechanism to control the amount of noise reduction during speech.

The idea of utilizing the uncertainty of signal presence in the noisy spectral components for improving speech enhancement is known in the art; see R. J. McAulay and M. L. Malpass, "Speech enhancement using a soft-decision noise suppression filter," *IEEE Trans. Acoust., Speech, Signal Processing*, vol ASSP-28, pp. 137-145, April 1980. After one calculates the probability that speech is present in a noisy environment, the calculated probability is used to adjust a noise suppression factor.

One way to detect voiced speech is to calculate the ratio between the noisy speech energy spectrum and the noise energy spectrum. If this ratio is very large, then we can assume that voiced speech is present. The speech presence probability is computed by first-order, exponential, averaging (smoothing) filter 87. The noise suppression factor is determined by comparing the speech presence probability with a threshold in spectral gain calculator 89. Specifically, the noise suppression factor is set to a lower value if the threshold is exceeded than when the threshold is not exceeded. The factor is computed for each band.

Spectral gain is limited to prevent gain from going below a minimum value, e.g. −20 dB. The system is capable of less gain but is not permitted to reduce gain below the minimum. The value is not critical. Limiting gain reduces musical tone artifacts and speech distortion that may result from finite precision, fixed point calculation of spectral gain.

The lower limit of gain is adjusted by the spectral gain calculation process. If the energy in a Bark band is less than some threshold, $E_{th}$, then minimum gain is set at −1 dB. If a segment is classified as voiced speech, i.e., the probability exceeds $p_{th}$, then the minimum gain is set to −1 dB. If neither condition is satisfied, then the minimum gain is set to the lowest gain allowed, e.g. −20 dB. In one embodiment of the invention, a suitable value for $E_{th}$ is 0.01. A suitable value for $p_{th}$ is 0.1. The process is repeated for each band to adjust the gain in each band.

In all group-transform based processing, windowing and overlap-add are known techniques for reducing the artifacts introduced by processing a signal in groups in the frequency domain. The reduction of such artifacts is affected by several factors, such as the width of the main lobe of the window, the slope of the side lobes in the window, and the amount of overlap from group to group. The width of the main lobe is influenced by the type of window used. For example, a Hanning (raised cosine) window has a broader main lobe and lower side lobe levels than a rectangular window.

In order to avoid abrupt gain changes across frequencies, the spectral gains are smoothed along the frequency axis using the exponential averaging smoothing filter 92. Abrupt changes in spectral gain are further reduced by averaging the spectral gains in each Bark band, block 95. In a rapidly changing, noisy environment, a low frequency noise flutter will be introduced in the enhanced output speech. This flutter is a by-product of most spectral subtraction based, noise reduction systems. If the background noise changes rapidly and the noise estimation is able to adapt to the rapid changes, the spectral gain will also vary rapidly, producing the flutter. The low frequency flutter is reduced by averaging the spectral gain over time in first-order exponential averaging smoothing filter 94.

A clean speech spectrum is obtained by multiplying the noisy speech spectrum with the spectral gain function in block 75 (FIG. 7). The spectrum is converted to time domain in inverse transform 76 and is windowed using synthesis window 77 to reduce the grouping artifacts. Finally, the windowed clean speech is overlapped and added with the previous frame, as follows in block 78.

FIG. 9 is a block diagram of a comfort noise generator constructed in accordance with a preferred embodiment of the invention. Background noise estimator 84 (FIG. 8) produces high-resolution comfort noise data that matches the background noise spectrum. Comfort noise is generated in the frequency domain by modulating a pseudo-random phase spectrum and is then transformed to the time domain using an inverse DFT. Forward DFT 72 and PSD estimate 81 (FIG. 8) operate as described above for noise suppression.

Generator 101 produces a random phase frequency spectrum having unity magnitude. One way to generate the phase spectrum of the comfort noise is by using a pseudo-random number generator that is uniformly distributed in the range [−p, p]. Using the phase spectrum, the unity magnitude and random phase frequency spectrum can be obtained by computing real and imaginary components from the phase spectrum. However, this method is computationally intensive.

Another method is to first generate the random frequency spectrum (both magnitude and phase are random) by using the pseudo-random generator to generate the real and imaginary parts of this spectrum, and then normalize this spectrum to unity magnitude. Because the real and the imaginary parts of the random frequency spectrum are uniformly distributed, the derived phase spectrum will not be uniform. By selecting the appropriate boundary values of the uniformly distributed random numbers, it is possible to generate the phase spectrum that is more uniform. Compared with the previous method, this method needs one extra random number generator and one fractional division but avoids calculating transcendental functions.

A simpler and more efficient way to generate a unit magnitude, random phase spectrum is by using an eight phase look-up table. The phase spectrum is selected from one of the eight values in the look-up table using a uniformly distributed, random number. Specifically, the number is uniformly distributed in the range [0,1] and is quantized into eight different values. (A random number in the range 0-0.125 is quantized to 1. A random number in the range 0.126-0.250 is quantized to 2, and so on.) The quantized values are also uniformly distributed and correspond to particular phase shifts, e.g. 45°, 90°, and so on. The number of phases is arbitrary. Eight phases have been found sufficient to generate comfort noise without audible artifacts. This technique is more easily implemented than the first technique because it does not involve division or computing trigonometric functions.

Comfort noise gain is calculated in block 102 as a function of background noise level and noise reduction level. The VAD_OUTPUT control signal controls the operation of the block, on or off. If noise reduction is enabled, comfort noise gain is set, preferably from a look-up table, inversely proportional to the noise reduction level.

The spectrally matched, high resolution, frequency spectrum of the comfort noise is generated by multiplying the unity magnitude frequency spectrum from generator 101 by the comfort noise gain from calculation 102 in circuit 103. The spectrally matched frequency spectrum is transformed to time domain using the inverse DFT 104.

Because the generated comfort noise is random, audible artifacts are introduced at frame boundaries. In order to reduce the boundary artifacts, the comfort noise is windowed in block 105 using any arbitrary window. The windowed comfort noise is buffered and the output rate is synchronized with the output rate of the noise reduction algorithm.

The noise reduction algorithm described in connection with FIG. 7 and FIG. 8 may decrease the amount of noise reduction during a long non-speech interval. In addition, the processed signals may include musical artifacts during long non-speech intervals. To solve this problem, a speech burst detector is used to detect a long non-speech interval. Upon detection, linear noise reduction is applied on the noisy signal, with greater noise reduction than can be obtained from Bark band Weiner filtering because Bark band Weiner filtering creates artifacts, as described above. Switching to linear noise reduction eliminates tonal artifacts that would have been introduced by a modified Weiner filter during long non-speech intervals.

Figure 10:
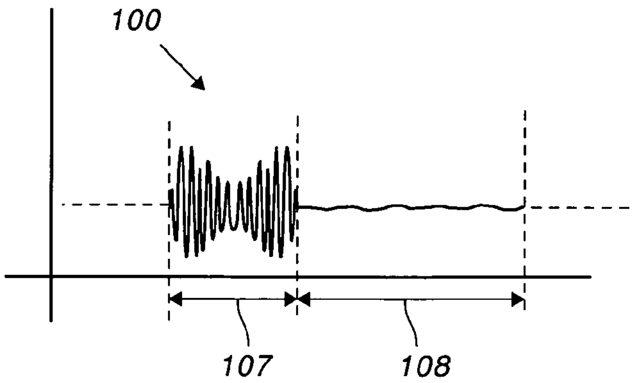
FIG. 10 illustrates a waveform having a speech portion and a non-speech portion.

In FIG. 10 waveform 100 represents a signal having speech portion 107 and non-speech portion 108. The duration of the portions is not to scale. As used herein, a "long" non-speech portion has a duration on the order of 300 ms. (about seventy-five frames or about twenty-five super-frames) or more. The improvements depend upon detecting long non-speech intervals.

Figure 11:
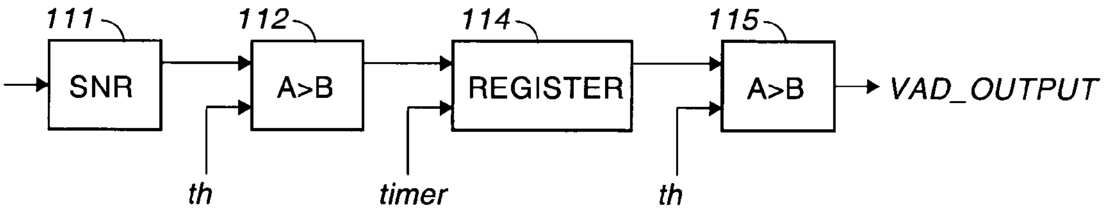
FIG. 11 is a block diagram of a circuit for detecting long non-speech intervals.

FIG. 11 is a block diagram of a circuit for detecting long non-speech intervals. The detector is based on a simple energy based method. The signal to noise ratio (SNR) 111 in a super-frame is compared with a pre-determined threshold, th. If the SNR is greater than the threshold, then the super-frame is designated as speech frame, otherwise, the super-frame is designated as non-speech frame. A super-frame is declared a speech frame only when the SNR is greater than the threshold for a certain number of consecutive frames, e.g. two. The number of speech frames per period is counted in register 114 and compared with a threshold in comparator 115.

In one embodiment of the invention, the threshold duration for a long interval was set at thirty-one super-frames. Positive logic was used, i.e. zero ("0") represents "false" or non-speech and one ("1") represents "true" or speech. These are non-critical design choices. Other values or negative logic could be used instead.

The speech detector flag, VAD_OUTPUT, is set to one if the super-frame is declared as a speech frame for at least one frame within past n frames. If VAD_OUTPUT is zero then it means there is a long non-speech interval.

Figure 12:
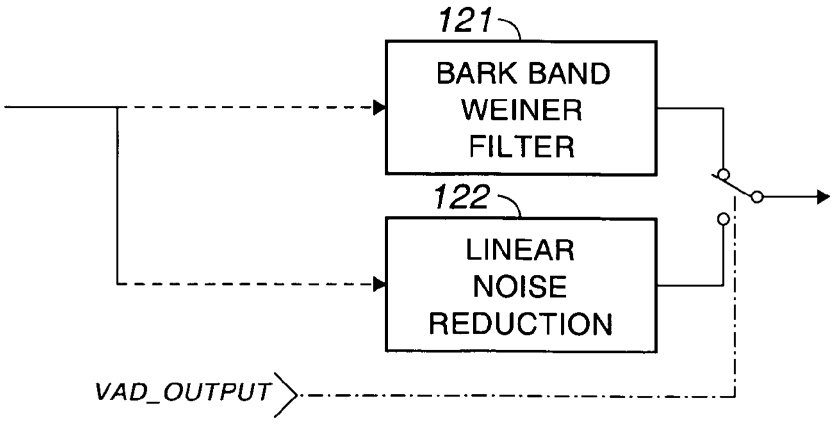
FIG. 12 illustrates one aspect of the invention.

In accordance with the invention, as illustrated in FIG. 12, Bark band Weiner filter 121 and linear noise reduction circuit 122 are alternately selected by switching circuitry controlled by VAD_OUTPUT. Linear noise reduction is used when VAD_OUTPUT is zero. If circuit gain is changed suddenly while switching from the modified Weiner filter in the noise suppression circuit to linear noise reduction, or vice-versa, there can be an unpleasant change in the background noise. In order to avoid this effect, gain is changed very slowly using a slow decay filter to smooth gain in the noise reduction circuit. The filter is of the weighted, running average form, $$G(k,m)=\alpha*G(k,m-1)+(1-\alpha)\gamma$$

where G(k,m) is the gain for bin k at frame m, $\gamma$ is the frequency independent linear gain, and $\alpha$ is the smoothing constant. For slow decay, a value of 0.992 was used for $\alpha$ in one embodiment of the invention. For fast decay, a value of 0.300 was used. These values are for example only.

Figure 8:
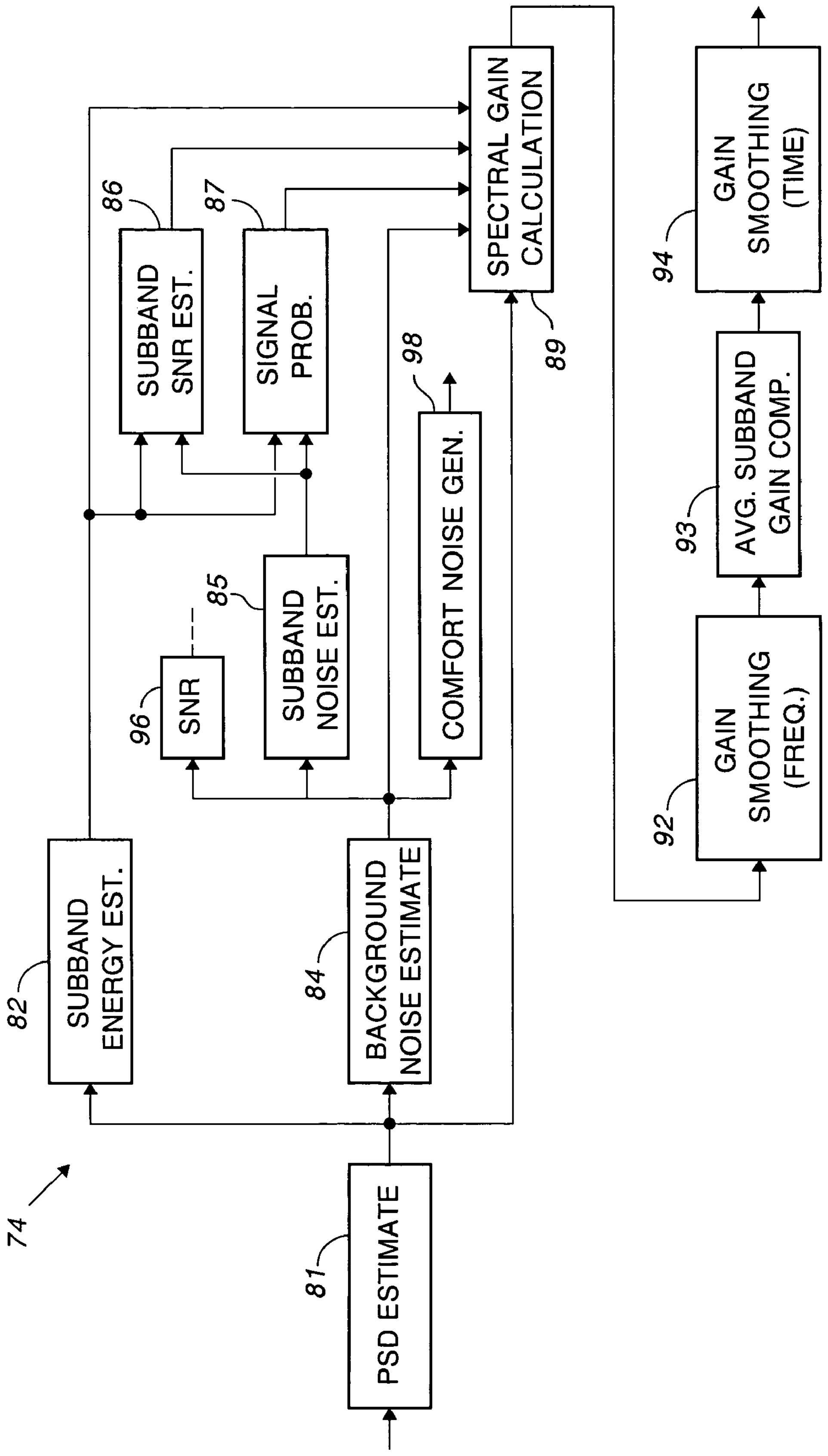
FIG. 8 is a block diagram of a circuit for calculating noise in frequency domain.

In a preferred embodiment of the invention, the smoothed noise estimate from FIG. 8 is used in the calculation of the SNR. The performance of a simple energy based detector is restricted by the amount of background noise, some modifications are made in the SNR calculation to improve the VAD performance in low input SNR conditions. Significant performance improvement is obtained when the SNR is calculated after the noise cancellation block. That is, performance is improved if block 111 (FIG. 11) is coupled to the output of block 75 (FIG. 7). The performance improvement is achieved because the Bark band based modified Weiner filter improves the SNR of the noisy speech signal. Calculating SNR for the full band in frequency domain is equivalent to calculating SNR in the time domain, based upon Parseval's Theorem.

The SNR calculation is done in frequency domain because the noise estimate is available in the frequency domain.

Comfort noise gain is adjusted based on the Bark band based, over-subtraction factor. A global (with respect to spectral bin numbers) parameter is used to match the comfort noise level. A drawback to this method is that the synthetic comfort noise is not spectrally matched to the real background noise when linear noise reduction is enabled. Moreover, it is cumbersome to tune the comfort noise level when the minimum gain in the noise reduction algorithm is changed. To solve these problems, the comfort noise gain is adjusted based on the spectral (noise reduction) gain, as illustrated in FIG. 13. This enhancement reduces tuning effort and improves the spectral quality of the comfort noise. Note that the spectral gain affects comfort noise generation even when linear noise reduction is not being used.

The quality of comfort noise is compromised by overestimating the background noise during speech. To improve the quality of comfort noise, in accordance with the invention, the long interval detector (FIG. 11) is used to prevent estimation of background noise during speech. Background noise estimate (block 84, FIG. 8) for comfort noise generator 98 is updated only when VAD_OUTPUT is zero. The background noise is updated based on the modified Doblinger's noise estimation algorithm. The smoothed noise estimate discussed above is used in the calculation of the SNR.

If spectral gain from the noise suppresser is used, then the level of the generated comfort noise is matched more closely to the reduced background noise. This results in a smoother transition from noise reduction mode to comfort noise insertion mode. The smoother transition produces a pleasant sounding effect. However, the drawback with this technique of controlling the comfort noise gain is that, if the comfort noise needs to be inserted immediately after a speech segment, then the comfort noise gain will be exaggerated because the amount of noise reduction is less during the speech segment. The exaggerated comfort noise gain will result in noise pumping. To avoid noise pumping, the comfort noise gain is updated only when speech is not present, i.e. when there is background noise only on the input. This is because the noise reduction gain is directly proportional to the signal to noise ratio. Hence, when the comfort noise is updated, during the frames where the SNR is high, noise pumping will be heard because of the overestimation of comfort noise gain. In order to reduce this effect, VAD_OUTPUT and a smoothing filter is used to control the comfort noise gain. The filtered output from filter 94 (FIG. 8) can be used or a separate filter can be used.

The invention thus provides an increased noise suppression during long non-speech intervals and an improved spectral matching of comfort noise to background noise. In addition, the improvements substantially eliminates noise pumping and enables one to adjust the level of comfort noise in a way that is completely dependent on noise reduction parameters.

Having thus described the invention, it will be apparent to those of skill in the art that various modifications can be made within the scope of the invention. For example, long non-speech intervals can be detected in time domain using the entire spectrum of signal or a reduced spectrum.

What is claimed as the invention is:

1. In a telephone having an audio processing circuit including an analysis circuit for dividing a audio signal into a plurality of frames, each frame containing a plurality of samples, a noise suppression circuit, and a noise reduction circuit, the improvement comprising:

means for detecting long non-speech intervals; and means for switching to noise reduction from noise suppression when a long, non-speech interval is detected.

2. The telephone as set forth in claim 1 and further comprising:

a gain smoothing filter in said noise reduction circuit, wherein said gain smoothing filter has a long time constant when switching to noise reduction from noise suppression to provide a gradual transition from one level of gain to another.

3. The telephone as set forth in claim 2 wherein said filter has a short time constant during short non-speech intervals.

4. The telephone as set forth in claim 1 wherein said means for detecting is coupled to the output of said noise suppression circuit, thereby improving the performance of the means for detecting at low signal to noise ratio.

5. In a telephone including a noise suppression circuit having a circuit for estimating background noise and having a comfort noise generator coupled to said noise suppression circuit for generating comfort noise based on data from said circuit for estimating background noise, the improvement comprising:

means for detecting long non-speech intervals; and means coupled to said circuit for postponing an estimate when said means for detecting long non-speech intervals detects a long non-speech interval.

6. In the telephone as set forth in claim 5, wherein said telephone further includes spectral gain calculation circuitry and said improvement further comprises:

means for adjusting the gain of the comfort noise based upon data from said spectral gain calculation circuitry.

7. The telephone as set forth in claim 6 wherein said data is averaged.

8. The telephone as set forth in claim 5 wherein said means for detecting is coupled to the output of said noise suppression circuit, thereby improving the performance of the means for detecting at low signal to noise ratio.

* * * * *